(12) United States Patent
Chen et al.

(10) Patent No.: US 7,620,687 B2
(45) Date of Patent: Nov. 17, 2009

(54) DISTRIBUTED REQUEST ROUTING

(75) Inventors: Chung-Min Chen, Basking Ridge, NJ (US); Wai Chen, Parsippany, NJ (US); Yibei Ling, Belle Mead, NJ (US); Marcus Pang, Manalapan, NJ (US); Shengwei Cai, Florham Park, NJ (US)

(73) Assignees: Telcordia Technologies, Inc., Piscataway, NJ (US); Toyota Motor Corporation (JP)

( * ) Notice: Subject to any disclaimer, the term of this patent is extended or adjusted under 35 U.S.C. 154(b) by 41 days.

(21) Appl. No.: 10/876,983

(22) Filed: Jun. 25, 2004

(65) Prior Publication Data

US 2006/0047751 A1    Mar. 2, 2006

(51) Int. Cl.
*G06F 15/16* (2006.01)
(52) U.S. Cl. .................. 709/205; 709/223; 709/224; 709/203; 709/225; 709/235; 709/237; 709/229; 709/227; 709/217; 370/231; 370/352; 707/10; 711/144
(58) Field of Classification Search ................. 709/205, 709/203, 223, 224, 235, 200, 225, 226, 237, 709/238, 246, 229, 236, 227, 217, 219; 370/231, 370/392, 352; 707/10; 711/144; 718/102, 718/105
See application file for complete search history.

(56) References Cited

U.S. PATENT DOCUMENTS

| | | | |
|---|---|---|---|
| 6,324,580 B1 * | 11/2001 | Jindal et al. .................. 709/228 |
| 7,475,108 B2 * | 1/2009 | Di Giulio et al. ............ 709/203 |
| 2002/0049843 A1 * | 4/2002 | Barone et al. ............... 709/225 |
| 2003/0088660 A1 * | 5/2003 | Florman et al. ............. 709/223 |
| 2003/0123432 A1 * | 7/2003 | Cheng et al. ................ 370/352 |
| 2003/0126183 A1 * | 7/2003 | Wu et al. ..................... 709/105 |
| 2006/0047751 A1 * | 3/2006 | Chen et al. .................. 709/205 |
| 2006/0112170 A1 * | 5/2006 | Sirkin ........................ 709/217 |

* cited by examiner

*Primary Examiner*—Ario Etienne
*Assistant Examiner*—Barbara N Burgess
(74) *Attorney, Agent, or Firm*—Philip J. Feig

(57) ABSTRACT

A plurality of servers for processing client requests forward the requests among themselves to achieve a balanced load. When a server initially receives a client request, it randomly selects another of the plurality of servers, referred to as a first-chance server, and forwards the request to this server. Upon receiving the request, the first-chance server determines if it is overloaded and if not, processes the request. However, if overloaded, the first-chance server compares its load to the load of one or more predetermined next-neighbor servers. If the next-neighbor server(s) are more loaded than the first-chance server, the first-chance server processes the request. Otherwise, the first-chance server forwards the request to the least loaded next-neighbor server. The next-neighbor receiving the request either processes it directly, or alternatively, based on its current load and that of its next-neighbor server(s), forwards the request to another next-neighbor server for processing.

14 Claims, 8 Drawing Sheets

DISTRIBUTED REQUEST ROUTING

FIELD OF THE INVENTION

Our invention relates generally to load balancing. More particularly, our invention relates to request routing methods for balancing requests among a plurality of servers for processing.

DESCRIPTION OF THE BACKGROUND

Client-server applications are increasingly being deployed across multiple servers. These servers may or may not reside at different geographical locations and, together, provide the back-end processing power for the specific applications. For example, the servers could support a content delivery network, such as geographically distributed Web cache proxies that cache web pages and respond to requests from client Web browsers. The servers could also be general-purpose computing machines (PCs, workstations, . . . ) of a GRID facility deployed on the Internet where each server receives and processes tasks submitted by the GRID client-users. The servers could also be database servers, such as shared-disk or shared memory parallel database servers or replication database servers. Similarly, peer-to-peer applications are also being deployed across multiple computing machines, with any given peer from among a group of peers processing a request from another peer/servent (Note that client-server terminology and examples will be used to describe our invention for ease of description. However, it should be understood that our invention is also applicable to other architecture/applications, including peer-to-peer architectures.)

For description purposes, assume there are m servers (numbered 0, 1, . . . , m−1) directed at processing requests/tasks for a particular application and any arbitrary number of clients that may send requests/tasks to these servers. Traditionally, in these multi-server environments, the server among the m servers that initially receives a given client request services that request and sends the result back to the client. However, these multiple server environments are increasingly using request routing in order to service client requests. Under request routing, the server that actually receives a client request will use some scheme to determine another of the m servers and will then forward the request to this determined server for processing. For example, FIG. 1 shows an example network 100 of servers 102-105 and clients 110-115 that send requests/tasks to these servers for processing. Assume client 112 sends a request 120 to server 103 (the choice of server 103 can either be a random or a predetermined choice). Upon receiving this request, server 103 runs a request routing scheme to determine another server to actually service the request, such as server 105. Server 103 then forwards the request 120 from client 112 to this server 105. Server 105 then processes this request and returns the result 121 to server 103, which then forward the result to client 112.

Administrators use request routing schemes in these multi-server environments for different purposes, such as for routing a request to the server that is more likely to have the content information the client is seeking, routing the request to server/network based on proximity to the client, routing a request based on bandwidth availability, and routing a request in order to balance load among the servers. The latter use, load balancing, is of particular concern here. More specifically, given a multi-server environment of m servers supporting any number of clients, an increasing use of request routing is to distribute client requests among the servers in order to achieve good performance scalability. Load balancing request routing schemes ensure the load at each of the m servers grows and shrinks uniformly as the client request arrival rates increase and decrease, thereby ensuring overall shorter response times (e.g. web page download time, task completion time), higher throughput, and higher availability to client requests. Nonetheless, load balancing request routing schemes that are scalable as the client request rate and/or number of servers increases and that achieve balanced load among distributed servers are difficult to obtain because of the dynamic nature of the overall system and because of the unpredictable task arrival patterns and task sizes.

Several request routing schemes/methods have been used in the past for load balancing, including: (1) "lowest load", (2) "two random choices", (3) "random", and (4) "round-robin". The "lowest load" request routing method depends on a server knowing the loads of all servers when a client request is received. Specifically, this method is typically implemented in either a decentralized or centralized fashion. Under the decentralized implementation, any of the m servers can initially receive a client request. When a server receives a request, it determines the server among the group of m servers that currently has the lowest load and then routes/forwards the request to that server for processing. Under the centralized implementation a dispatcher is used. This dispatcher initially receives any given client request and then forwards the request to the server with the currently lowest load.

Regardless of the implementation, the "lowest load" method optimally distributes load among the servers when the dispatcher/initial server knows the loads of all other servers at the instance it receives and forwards a request. Under these conditions, the lowest load method is able to balance the load among the servers and is scalable, with the overall response time to client requests slowly increasing as the client request rate increases. However, if these ideal conditions are not met and the current load information at the servers is not accurate (i.e., becomes stale), the load balancing becomes less accurate causing the average response times to client requests to drastically increase.

One method by which load information is disseminated among servers under the "lowest load" method is through a polling method. Here, the dispatcher or each server periodically polls other servers for their current load. Ideally, the polling rate is set very high such that the dispatcher/servers stay current as to the current loads among the other servers. However, polling requires message overhead on the order of $O(m)$ per dispatcher/server. Similarly, as a given network grows and the number of servers m increases, the polling burden at the dispatcher/servers also increases. Hence, there is a tradeoff between a high/adequate polling rate, which increases overhead but keeps the load information current, verses a low polling rate, which reduces overhead but produces stale load information.

The piggyback method is an alternative to the polling method and its correspondingly high messaging overhead. Typically, when a server forwards a request to another server for processing, the processing server will return a response to the forwarding server. Under the piggyback method, the processing server also sends its current load to the forwarding server when returning this response. The forwarding server uses this load when processing subsequent client requests. As a result, this method does not suffer from the overhead issues of the polling method. Nonetheless, like above, if load information is not current at each server, the server may forward client requests to another server that is not the least loaded, causing the average response time to client requests to increase.

More specifically, dissemination of load information under the piggyback method is directly tied to the request rate. An increase in the request rate means that each server receives initial client requests more frequently, which means each server forwards requests more frequently and in turn receives load information more frequently. Hence, if the request rate is too low, load information is not kept current. Somewhat related to this problem, as a given network grows and the number of servers m increase, it becomes more difficult for each server to remain current on all other servers because the requests are more broadly distributed/disbursed. Notably, the dispatcher method may overcome some of these issues, but the dispatcher then becomes a bottleneck and a single point of failure to the system.

The "lowest load" method also suffers from the "flashing crowd" problem, which is directly related to the staleness of load information. In general, assume a given server has a relatively lower load than the other servers. If load information on this server is not being disseminated frequently enough to all other servers, the other servers will consistently determine this server is under-loaded and will all re-direct their requests to this server causing this server to suddenly become overloaded. The problem then cascades. The remaining servers now sense the next lowest loaded server and again re-direct their requests to it, causing this server to become overload. This scenario continues in turn on each of the servers ultimately defeating the original intent of balancing the load.

Turning to the "two random choices" method, here each time a server initially receives a request from a client it selects two other servers at random uniformly among all servers. The initial server then compares the loads of the two randomly selected servers and forwards the request for processing to the server with the lesser load. For example, in FIG. 1 assume client 110 sends a request to server 103. Upon receiving this request, server 103 randomly determines two other servers, such as server 102 and server 104. Server 103 then compares the current load of server 102 to the current load of server 104 and forwards the request to the server with the lesser load. This server then returns the result to server 103, which forwards the result to the client 110.

Similar to the "lowest load" method, the "two random choices" method ideally requires each server to know the loads of all other servers (as the two randomly selected servers can be any of the servers) at the instance a request is being forwarded. Assuming these ideal conditions are met, the "two random choices" method performs and scales almost as well as the "lowest load" method, with the overall response time to client requests increasing slowly as the client request rate increases. However, like above, the "two random choices" method in practice uses the piggyback method or the polling method, which requires a message overhead on the order of O(m) per server. As such, the two "random choices" method has the same issues as the "lowest load" method as described above; if the load information is not disseminated often enough among the servers, the information at each server becomes stale and, as a result, the average response time to client requests drastically increases. Accordingly, this method can also suffer from the flashing crowd problem.

Turing to the "random request" routing method, here each time a server initially receives a request from a client it forwards the request to another server chosen at random uniformly among all servers. Because load information is never used, this method avoids all the shortcomings encountered under the "lowest load" and "two random choices" methods in passing load information around. There is no messaging overhead and, as such, no staleness issue. Accordingly, this method does not suffer from the "flashing crowd" problem and is not adversely affected as the number of servers m increases, with the response time to client requests remaining constant.

However, it has been proven as well as experimentally shown that the random request method does not scale well and does not equally spread the load among the m servers. More specifically, as the client request rate increases, some servers become more heavily loaded than others and reach their maximum load capacity earlier than others. As a result, the overall response time to client requests among the m servers increases as the overloaded servers become unavailable or experience delay in processing the requests. As such, assuming the load information under the "lowest load" and "two random choices" methods remains accurate, these two methods perform substantially better than the "random" method.

Turning to the "round-robin" request routing method, for each request a server initially receives from a client, the server successively forwards the requests in a round-robin fashion to other servers for processing (i.e., the initial server forwards request a to server i, forwards request b to server i+1, forwards request c to server i+2, etc.). This mechanism avoids the use of random number generators to choose a server and again, avoids the downside of having to pass load information among the servers. In general, however, it is commonly known that this method has the same issues as the "random" method with respect to scalability. As the client request rate increases, some servers become more heavily loaded than others causing response times to client requests to rapidly increase. In addition, it is possible for the servers to become synchronized under this method and for each to forward its requests to the same servers in a progressive fashion, thereby causing the "flashing crowd" scenario.

As indicated, the "lowest load" and "two random choices" methods perform substantially better than the "random" and "round-robin" methods, assuming the load information does not become too stale. There are still other request routing methods that rely on the passing of load information and that have been shown to balance loads well, even when the load information is stale. However, like the "lowest load" and "two random choices" methods, these other methods require substantial load messaging overhead when polling is used. More importantly, these other methods assume that all servers previously know the overall client request arrival rate, which is typically not realistic.

Overall, the prior methods for request routing load balancing have several drawbacks. The "lowest load" and "two random choices" methods perform well and scale as the request rate increases. However, these methods rely on knowing the load of all other servers and that this information remains accurate. The polling method can provide this accuracy, but at the expense of high messaging overhead. The piggyback method overcomes the messaging overhead problem, but does not keep all servers accurate unless the request rate is high. These methods also suffer from the flashing crowd problem. Other methods are less affected by staleness of load information and perform as well as these two methods; however, these other methods rely on all servers knowing the request arrival rate, which is not practical. The "random" and "round-robin" methods do not require the passing of load information and thereby avoid the associated problems, but these methods do not scale well, with performance quickly degrading as the request arrival rate increases.

SUMMARY OF OUR INVENTION

Accordingly, it is desirable to provide a load-balancing request routing method that overcomes these and other disadvantages of the prior art and that both performs well and scales well as the request rate increases and that does not rely on large overheads to maintain load information among the servers. In accordance with our invention, when a server, among a group of m servers, initially receives a request from a client for processing, the server randomly selects another server from among the group of m servers and forwards the request to this server for processing. This randomly selected server is referred to as the first-chance server.

Upon receiving the forwarded request, the first-chance server compares its current load to an overload constant to determine if it is currently overloaded. If not overloaded, the first chance server processes the request and forwards the response back to the client, either directly or through the forwarding server. However, if the first-chance server is overloaded, it compares its current load to the load of a predetermined next-neighbor server. If the first-chance server is less loaded than or is relatively equally loaded to the next-neighbor server, the first-chance server processes the request. It then forwards the response back to the client.

However, if the first-chance server is more heavily loaded than the next-neighbor server, it forwards the request to the next-neighbor server. More specifically, the first-chance server forwards this request either directly, or alternatively, informs the initial forwarding server of the next-neighbor server. In this latter case, the forwarding server sends the request to the next-neighbor server for processing.

Regardless of how the next-neighbor server receives the request, in accordance with one embodiment of our invention, the next-neighbor server processes the request, forwarding the response either directly to the client or through the first-chance server/forwarding server. Alternatively, in accordance with a further embodiment of our invention, the next-neighbor server does not automatically process the request. Rather, it proceeds similar to the first-chance server, processing the request if it determines it is not overloaded. If overloaded, the next-neighbor server compares its load to that of its next-neighbor, either processing the request itself if less loaded than this second neighbor or alternatively, forwarding the request to this second neighbor if more heavily loaded than this second neighbor. If forwarded, the process continues in a similar fashion.

In accordance with a still further embodiment of our invention, the first-chance server maintains two or more next-neighbor servers, rather than only one as described above. Again, if the first-chance server is not overloaded, it processes the request itself. However, if overloaded, the first-chance server compares its load to that of its next neighbors. If one of these next-neighbors is less loaded than the first-chance server, the first-chance server forwards the request to this neighbor for processing. Otherwise, the first-chance server processes the request itself.

Overall, our invention is scalable, obtaining comparable if not better performance as compared to prior art methods as request rates increase. In addition, servers in accordance with our invention maintain more accurate load information and as a result, achieve significantly better performance.

DETAILED DESCRIPTION OF OUR INVENTION

Our invention is a simplified and scalable request routing method for distributing client requests/tasks to any of a plurality of m (0 to m−1) servers in order to achieve a balanced load among these servers. The number of clients that may send requests/tasks to the m servers for processing is arbitrary. In addition, how a client chooses an initial server to service a request can vary. A client can always choose the same server for all its requests or it can randomly choose a server for each request. (Note that our invention will be described using client-server terminology and examples; however it should be understood that our invention is also applicable to other architectures/applications, including peer-to-peer architectures).

In accordance with our invention, each server i (for i=0 to m−1) maintains an indicator $w_i$ that specifies the server's current workload. For example, $w_i$ may indicate the number of outstanding requests (i.e., requests that have not been completed) at server i. With respect to current load, each server also maintains two thresholds, $W_i$ and $\theta_i$. $W_i$ can be specific to each server or the same across several to all servers. $W_i$ is a threshold that specifies the point at which server i is becoming overloaded and should possibly off-load requests to another server. $\theta_i$ can also be specific to each server or the same across several to all servers and is a comparative threshold between server i and a next neighbor server indicating a point at which the next neighbor server is less loaded than server i and can thereby service additional requests on behalf server i. In general, $\theta_i$ should be set based on the relative computing power between server i and the next neighbor server.

Each server also maintains a hash function Hash: $Q_i$->{0, 1, ..., m−1}, where $Q_i$ is the space of all client requests and maps each request to a random number between zero (0) and m−1 with equal probability. A hash function, such as $Q_i$, is readily available and is not specific to our invention. For example, in the case of a Web page request q, where q is a URL, "$Q_i$='sum of all characters in the URL' mod m". Lastly, each server also maintains a notion of a next-neighbor server such that each server has a unique next-neighbor. For example, the m servers could be logically sequenced in a ring in which case the "next-neighbor" of server i can be defined as "next-neighbor='server (i+1) mod m'". In combination with maintaining a next-neighbor server, each server i is also able to determine the current load, $w_{next-neighbor}$, of this server, as described below.

Figure 1:
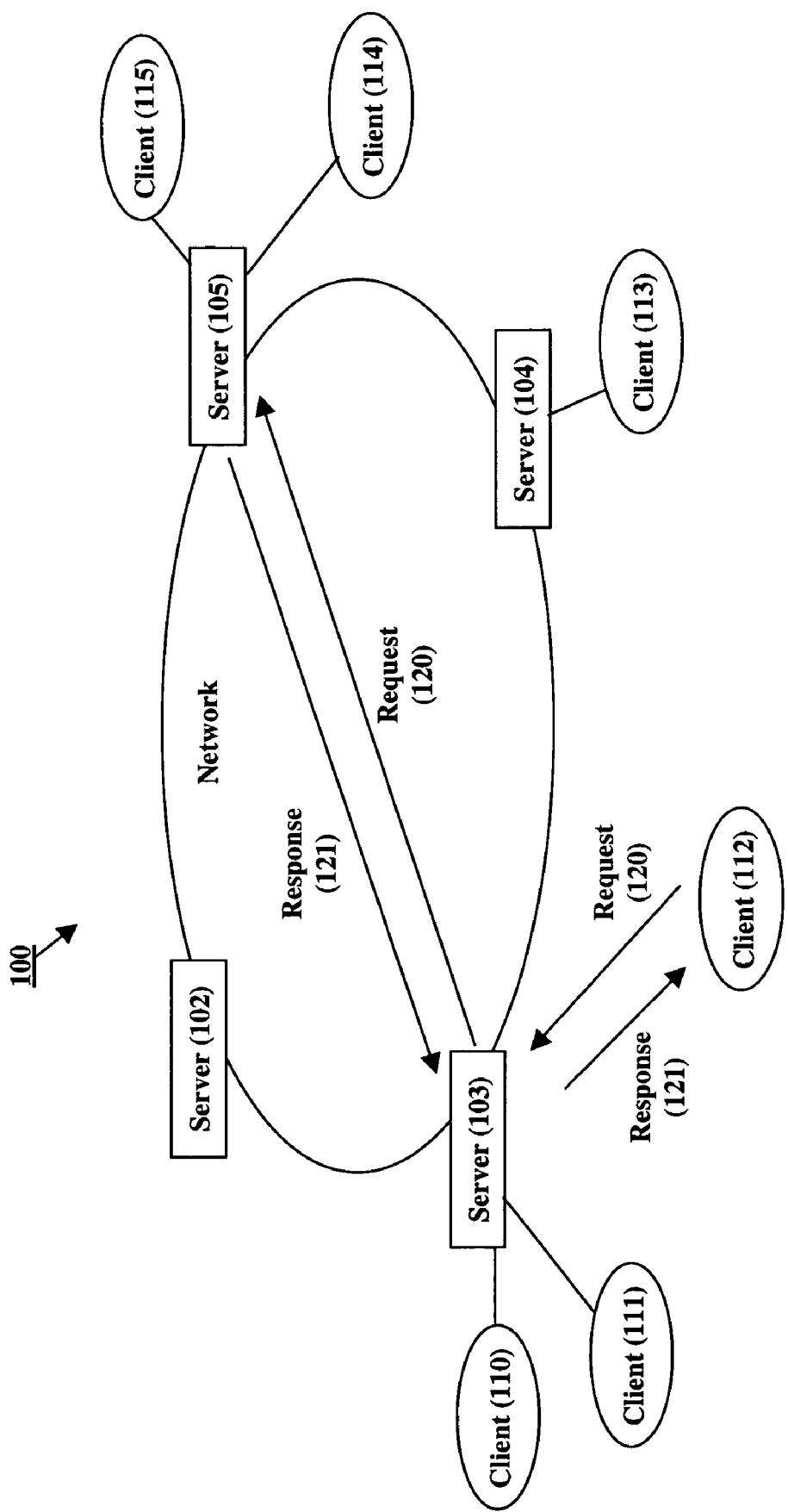
FIG. 1 is an illustrative example of a prior art load balancing request routing method.
Figure 2:
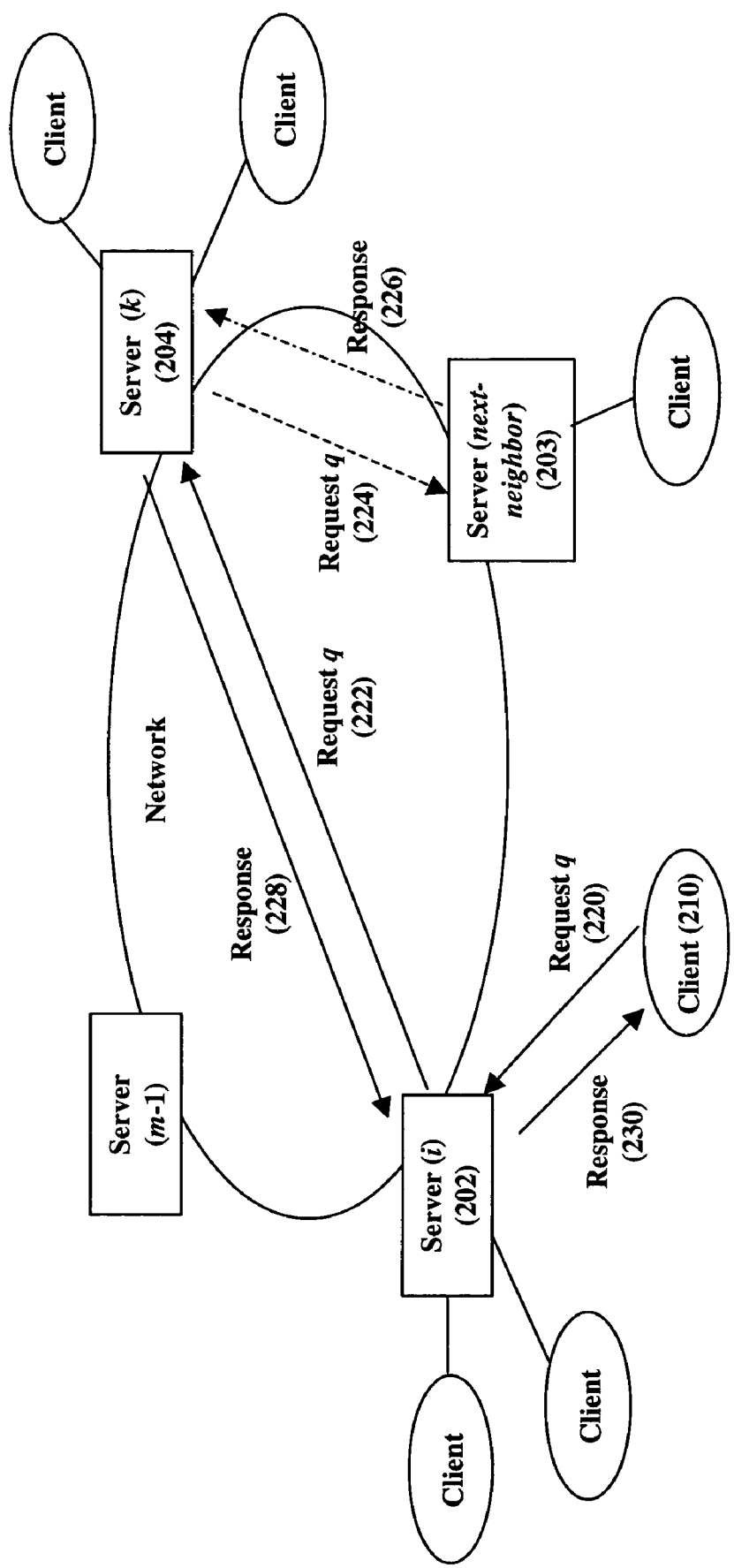
FIG. 2 depicts an illustrative example of a first embodiment of our invention as depicted in FIGS. 3A, 3B, and 3C.
Figure 3:
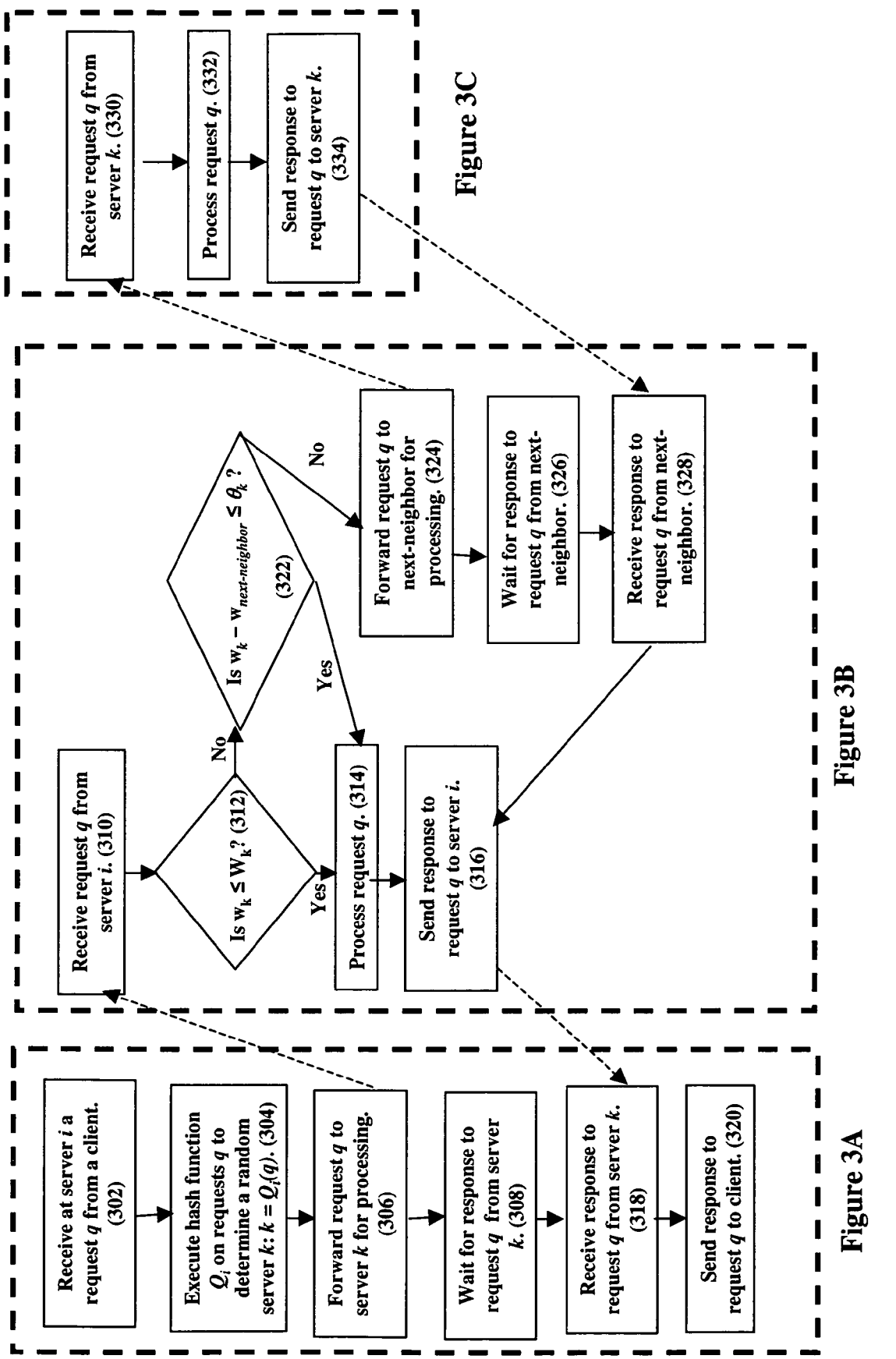
FIGS. 3A, 3B and 3C depict the method steps of a first illustrative embodiment of our invention for distributing client requests/tasks among servers to achieve a balanced load wherein the servers have a single next-neighbor server.

A first embodiment of our invention for request-routing client requests among servers comprises three modules, as depicted by the method steps of FIGS. 3A, 3B, and 3C and as shown by the illustrative example of FIG. 2. For description purposes, it is assumed that all of the m servers that are part of the request routing method of our invention execute each of the three modules. Whether and when a server executes a given module depends on how it receives a given request q, as described below. Nonetheless, it should be understood that it is not necessary for each sever to execute all modules. For example, a server executes the method of FIG. 3A when initially receiving a client request. If a given server never receives initial client requests, it will not need to execute the method of FIG. 3A. In addition, whether the methods of FIGS. 3A, 3B, and 3C execute as one process or several processes on a given server is not specific to our invention.

Turning to the specific steps of the first embodiment of our invention, when a client, such as client 210, makes an initial service request q to any given server i, such as server 202, the server i 202 executes the method of FIG. 3A. Specifically, in step 302 server i 202 first receives the request q (as shown by 220) from client 210. Upon receiving the request, server i 202 proceeds to step 304 and executes the hash function $Q_i$ based on the request q in order to randomly determine a server k, such as server 204, from among the m servers (i.e., $k=Q_i(q)$ for k=0 to m−1). Here, server k 204 is referred to as the "first-chance" server of request q. Upon determining server k 204, server i 202 proceeds to step 306 and forwards the request q (as shown by 222) to server k 204 for processing. Server i 202 then proceeds to step 308 to wait for a response from server k. Note that for description purposes, server k and server i are shown as different servers. Nonetheless, when server i chooses a random server k, it may select itself as part of choosing a random server from among the m servers (i.e., k may equal i).

Upon receiving the service request q 222 from server i, server k 204 executes the method of FIG. 3B. In general, server k will compare its current load to the load of its next-neighbor and based on this comparison determine whether it should service the request q directly or should off-load the request to its next-neighbor. More specifically, beginning with step 310, server k 204 receives the request q from server i 202. Server k then proceeds to step 312 and compares its own current load, $w_k$, with the threshold $W_k$. If $w_k$ is less than or equal to $W_k$ (i.e., (i.e., is $w_k \leq W_k$)), server k is not overloaded. In this case, server k proceeds to step 314 and processes the request q. Server k then returns a response to request q (as shown by 228) to server i 202 in step 316. In step 318, server i receives this response from server k and returns this response (as shown by 230) to the client 210 in step 320. Note that in step 202, nothing precludes server k from directly returning the response to request q directly to client 210 and our invention is equally applicable to either alternative.

However, if server k 204 in step 312 determines it is overloaded (i.e., is $w_k > W_k$), server k next determines if it should forward the request q to its next-neighbor (here, for example, server 203) for processing. Specifically, in step 322 server k compares its current load, $w_k$, to its next-neighbor's 203 current load, $w_{next-neighbor}$, and determines if the two loads are within the threshold $\theta_k$ (i.e., is $w_k - w_{next-neighbor} \leq \theta_k$). Note that the timing of when server k 204 determines its next-neighbor's current load, $w_{next-neighbor}$, is not specific to our invention. For example, server k may request its next-neighbor's current load as part of step 322. If server k forwards the request q to its next-neighbor for processing, the next-neighbor can piggyback its current load with the response it sends back to server k. Server k would then use this load for a subsequent client request it receives as a first-chance server. Similarly, server k may periodically request the load as part of a background polling process. Alternatively, the next-neighbor server 203 may periodically send its load to server k.

If, in step 322, server k determines the two loads are within the threshold $\theta_k$, server k is either less loaded than its neighbor or the two servers are relatively equally loaded. In this case, server k proceeds to step 314 and processes the request q itself. In step 316, server k 204 returns the response to request q (as shown by 228) to server i 202. Server i, in step 318, receives this response from server k and returns the response (as shown by 230) to the client 210 in step 320. (Again, server k can alternatively send the response to request q directly to client 210.)

However, if server k 204 determines in step 322 that the two loads are not within the threshold $\theta_k$ and that the next-neighbor server 203 is more lightly loaded than itself, then the next-neighbor server 203 is in a better position to process request q. In this case, the next-neighbor server is referred to as the "second-chance server" of the request q. Accordingly, server k 204 proceeds to step 324 and forwards the request q (as shown by 224) to its next-neighbor server 203 for processing. Server k 204 then proceeds to step 326 to wait for a response from its next-neighbor server 203.

When receiving the request q from server k 204, the next-neighbor server 203 is a "second-chance server" and as such, executes the method of FIG. 3C. More specifically, beginning with step 330, server 203 receives the request q from server k 204. Server 203 then proceeds to step 332, where it processes the request q, and then proceeds to step 334 where it returns the response to request q (as shown by 226) to server k 204. In step 328, server k receives this response from server 203 and then returns the response (as shown by 228) in step 316 to server i 202. Server i 202 then returns the response (as shown by 230) to the client 210 in step 320. (Again, the next-neighbor server 203 can alternatively send the response to request q directly to client 210. Similarly, server k, upon receiving the response from server 203, can bypass server i and send the response directly to client 210).

In accordance with a second embodiment of our invention, when server k determines that its next-neighbor server 203 should process the request q (i.e., step 322), rather than forwarding the request q to the next-neighbor server 203 for processing in step 324, server k 204 informing server i 202 that the next-neighbor server 203 should process this request (i.e., steps 324 to 326 to 328 to 316 are bypassed). As such, from step 322 server k 204 immediately responds to server i by forwarding to it information regarding next-neighbor server 203. In response to receiving this information, server i directly forwards the request q to the next-neighbor server 203 and then waits for a response from server 203. Similar to above, when server 203 receives the request q, it processes the request and then forwards the response directly back to server i 202, which then returns the response to the client 210. Alternatively, server 203 can send the response directly to client 210.

Overall, note that in accordance with our invention, a request is forwarded from the random first chance server k to the second-chance/next-neighbor server only if the load on server k is at least $W_k$ and is at least $\theta_k$ more than the load on the next-neighbor server. Setting both $W_k$ and $\theta_k$ to zero means that the request q will be forwarded to the next-neighbor so long as the neighbor's load is lower than that of server k. However, at the other extreme, setting either $W_k$ or $\theta_k$ to a large number degenerates the method to the "random load" method, with server k always processing the request and never considering the next-neighbor. In general, an administrator can vary $W_k$ and $\theta_k$ between these two extremes based on the particular environment and application. For example, forwarding a request between a server k and its next-neighbor incurs some extra communication overhead; however, as discussed below, this forwarding of requests between the server k and the next-neighbor achieves increased load balancing as compared to the pure "random" method of the prior art. Accordingly, an administrator can adopt a suitable value for $W_k$ and $\theta_k$ in order to tradeoff between load balancing and this overhead. From a different perspective, assume the m servers are Web cache proxies. Here, an administrator can set $W_k$ and $\theta_k$ to values that favor server k over its next-neighbor, which has the effect of increasing the cache hit rate on server k. Again, this may be at the expense of load balancing. Accordingly, an administrator can adopt a suitable value for the two parameters to balance between cache hit rate and load balancing.

Overall, our invention is scalable, providing better performance than the "random" and "round-robin" methods and providing comparable if not better performance than the "least-load" and "two-random choices" methods. In addition to this advantage, our invention has minimal message passing overhead as compared to the "least-load" and "two-random choices" methods regardless of the method used, thereby making our invention less complex and simpler to implement. Similarly, our invention is less susceptible to stale load information.

Figure 4:
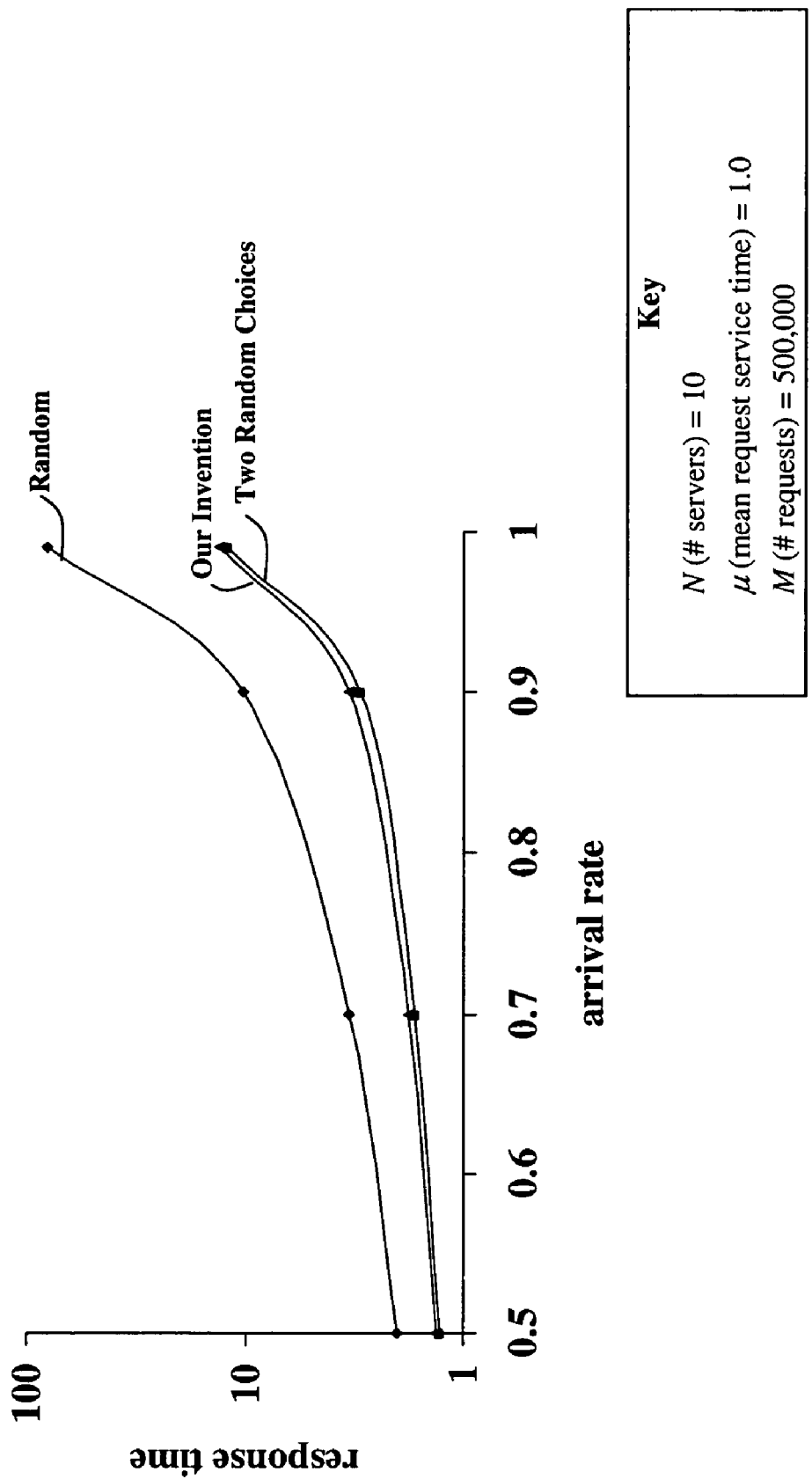
FIG. 4 shows scalability results of an exemplary simulation, comparing prior art load balancing request routing methods and our invention with respect to overall response times as request arrival rates are varied.

With respect to scalability, FIG. 4 shows an exemplary simulation comparing the "random" method, "two random choices" method, and our invention with respect to the overall response time as the arrival rate increases. This simulation was done under ideal conditions in which all servers under our invention and under the "two random choices" method accurately know the loads of all other servers at all time and with $W_k$ and $\theta_k$ under our invention set to zero (0) for all servers. As can be seen, our invention performed substantially better than the "random" method (again, the "round robin" method is presumed to have similar performance to the "random" method), which quickly degrades in performance as the request rate increases. Significantly, our invention performed just as well as the "two random choices" method (again, the "lowest load" method is presumed to have similar performance to the "two random choices" method).

Notably, a high periodic polling rate per server can achieve the ideal conditions under which this simulation was run. Significantly, the polling method under the "lowest load" and "two random choices" methods requires each server to know the current load of all other servers, placing a substantial burden of O(m) per server. Contrary to this substantial overhead, our invention requires each server to know the current load of only its next-neighbor, a complexity of O(1) per server. Again, the piggyback method makes the message passing overhead of our invention the same as the "lowest load" and "two random choices" methods. However, even here there is less complexity under our invention because servers need only maintain their own load and the load of a next-neighbor. Under the "lowest load" and "two random choices" methods, every server must maintain its own load and the load of every other server. Hence, our invention obtains comparable if not better performance as compared to prior art methods and with significantly less messaging overhead and/or complexity as compared to the better performing prior methods.

Figure 5:
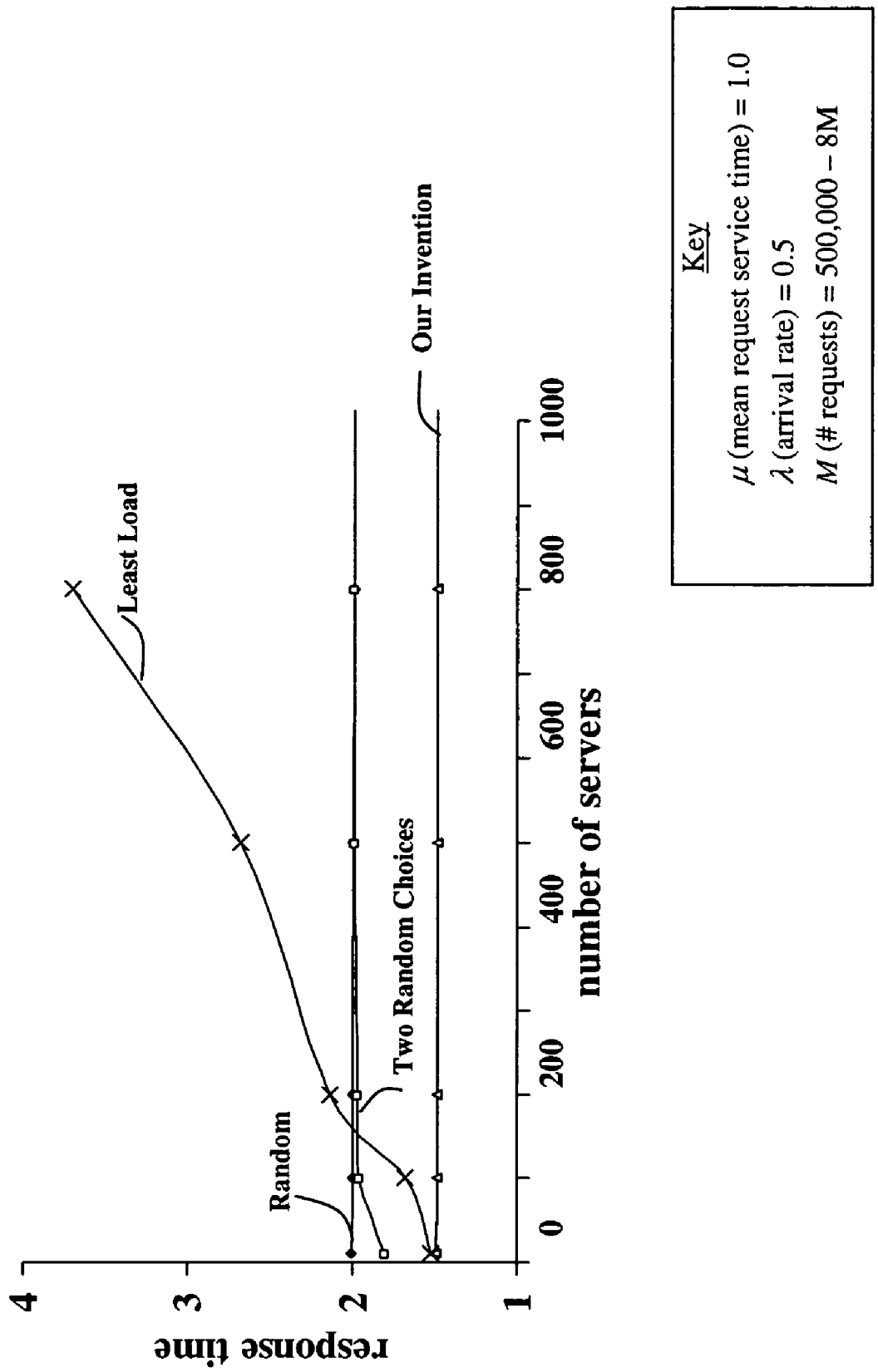
FIG. 5 shows an exemplary simulation comparing prior art load balancing request routing methods and our invention with respect to each method's susceptibility to stale load information.

With respect to susceptibility to stale load information, FIG. 5 show another exemplary simulation comparing the "lowest load" method, the "two random choices" method, the "random" method, and our invention with respect to the overall response time as the request/arrival rate is kept constant but the number of servers is increased. Here, the piggyback method was used to disseminate load information among the servers. As such, the messaging overhead and complexity of all methods is the same since loads are passed as a side benefit of passing responses. In addition, for our invention, $W_k$ and $\theta_k$ were set to zero (0) for all servers. Overall, the simulation shows the effect of servers having stale load information. As shown, the "two-random choices" and "lowest load" methods are susceptible to stale load information, with the "two-random choices" method degrading to the "random" method and the "lowest load" method essentially suffering from the flashing crowd effect. Overall, servers in accordance with our invention maintain more accurate load information and as a result, achieve significantly better performance.

Several other points should be made. First, because our method chooses the first-chance server at random and each server has a unique next-neighbor, our invention will not encounter the flashing crowd problem. Second, as discussed above, other prior art request routing methods achieve strong performance but require that each server know the loads of all other servers and that each server know the request arrival rate. Again, our invention is simplified compared to these methods, requiring that each server only know the load of its next-neighbor.

Figure 6:
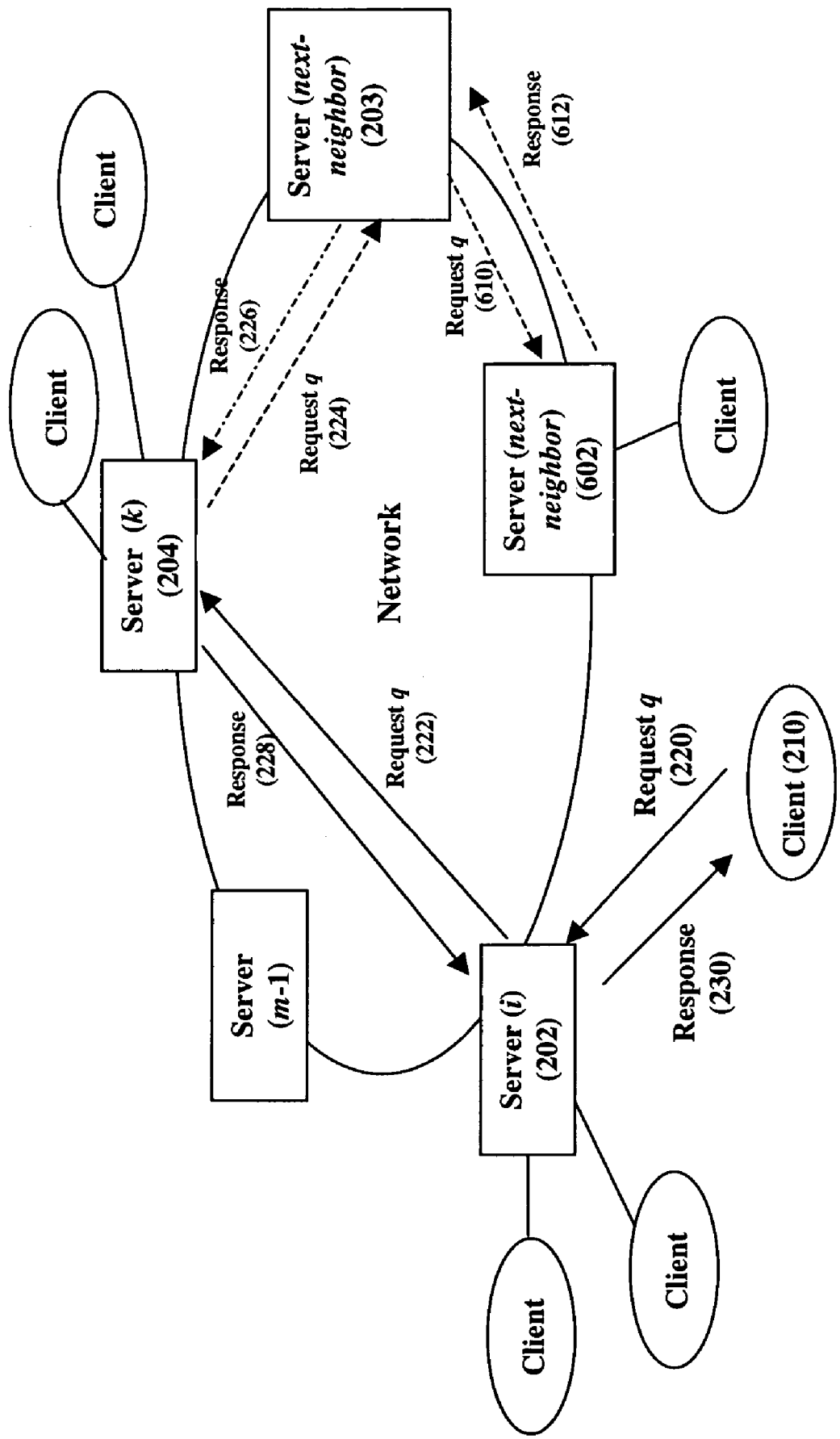
FIG. 6 depicts an illustrative example of a further embodiment of our invention for distributing client requests/tasks among servers.

Reference will now be made to further embodiments of our invention. In accordance with a third embodiment of our invention, an illustrative example of which is shown in FIG. 6, when the next-neighbor server 203 acts as a "second-chance server" and receives the service request q from server k 204, rather than executing the method of FIG. 3C and processing the request, it executes the method of FIG. 3B (in accordance with this embodiment of our invention, the method of FIG. 3C is not needed). More specifically, upon receiving a request q, the next-neighbor server 203 compares its current load to the constant $W_{next\text{-}neighbor\ 203}$. If server 203's load is less than or equal to $W_{next\text{-}neighbor\ 203}$, it is not overloaded and processes the service request q, forwarding the response back to client 210, either directly or through server k 204 and server i 202.

However, if the next-neighbor server 203 determines it is overloaded, it next determines if it should forward the request q to its next-neighbor server (e.g., server 602) for processing because that server is more lightly loaded. Again, this determination is based on a relative comparison of the loads of server 203 and server 602 with respect to the threshold $\theta_{next\ neighbor\ 203}$. If the server 203 determines it is less loaded than server 602 or that the two servers are relatively equally loaded, the server 203 processes the request q itself and forwards the response back to client 210, either directly or through server k 204 and server i 202.

However, if server 203 determines that server 602 is more lightly loaded and is in a better position to process request q, it forwards the request q (as shown by 610) to server 602 for processing. Accordingly, server 602 then proceeds to also execute the method of FIG. 3B, either executing the request and returning the response to the client (as shown by 612) or passing the request q to its next-neighbor. As such, the request q is continuously passed between servers until a given server is sufficiently under-utilized and/or has a lesser load than its next-neighbor. Again, note also that rather than each server passing the request q to its next-neighbor as just described, a server may refer its next-neighbor back to server i, which will then forward the request to the next neighbor, as was described in the second embodiment (i.e., server 204 would refer server i 202 to server 203, server 203 would refer server i to server 602, etc).

Figure 7C:
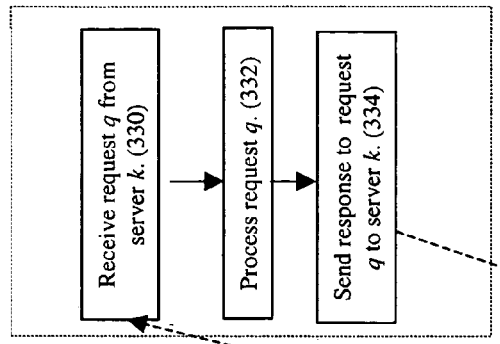
FIGS. 7A, 7B, and 7C depict the method steps of still a further illustrative embodiment of our invention for distributing client requests/tasks among servers to achieve a balanced load wherein the servers have two or more next-neighbor servers.
Figure 7B:
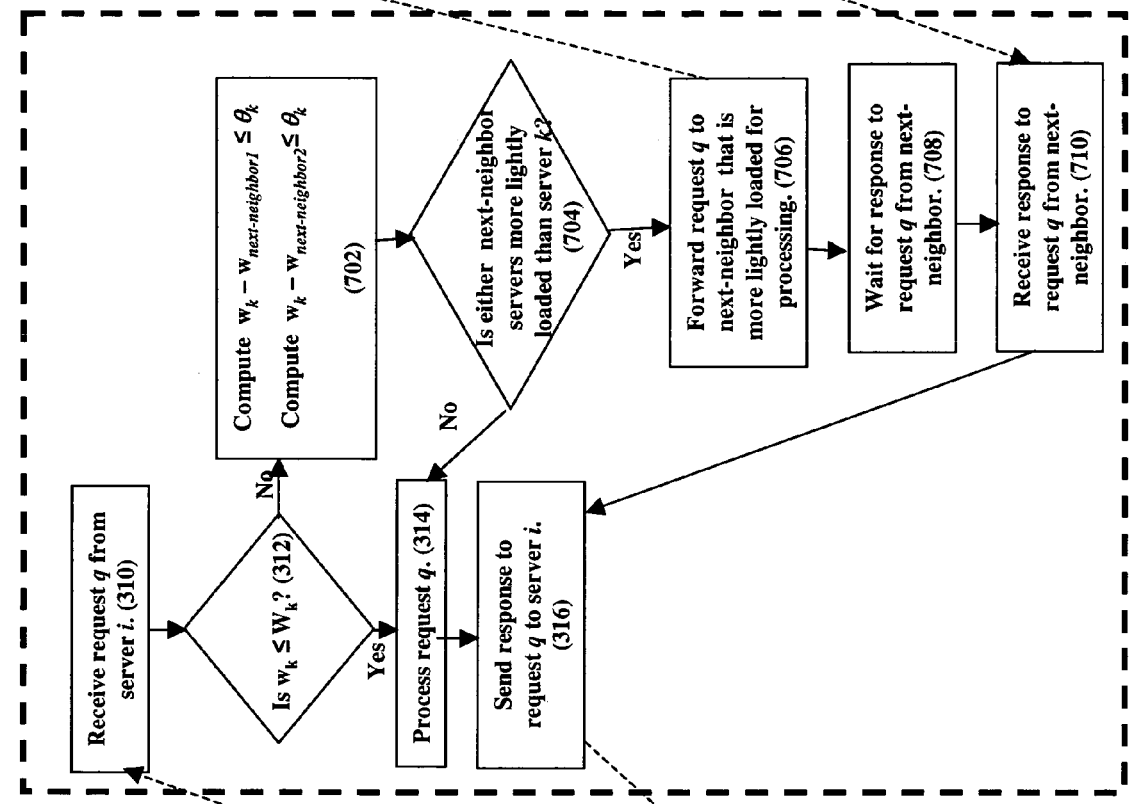
Figure 7A:
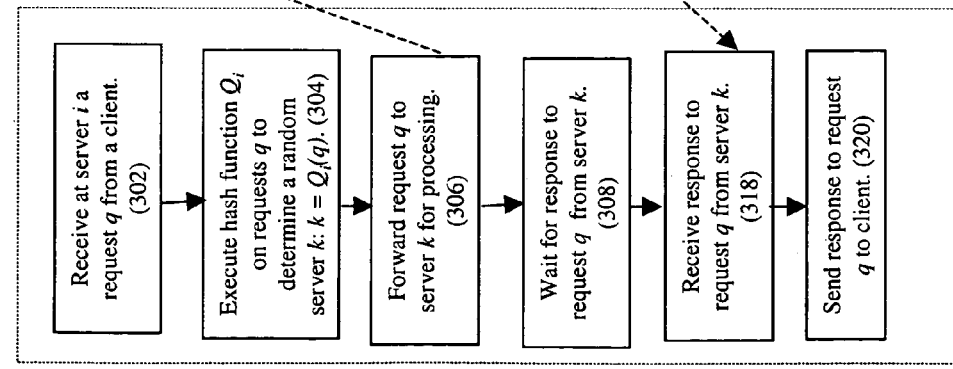
Figure 8:
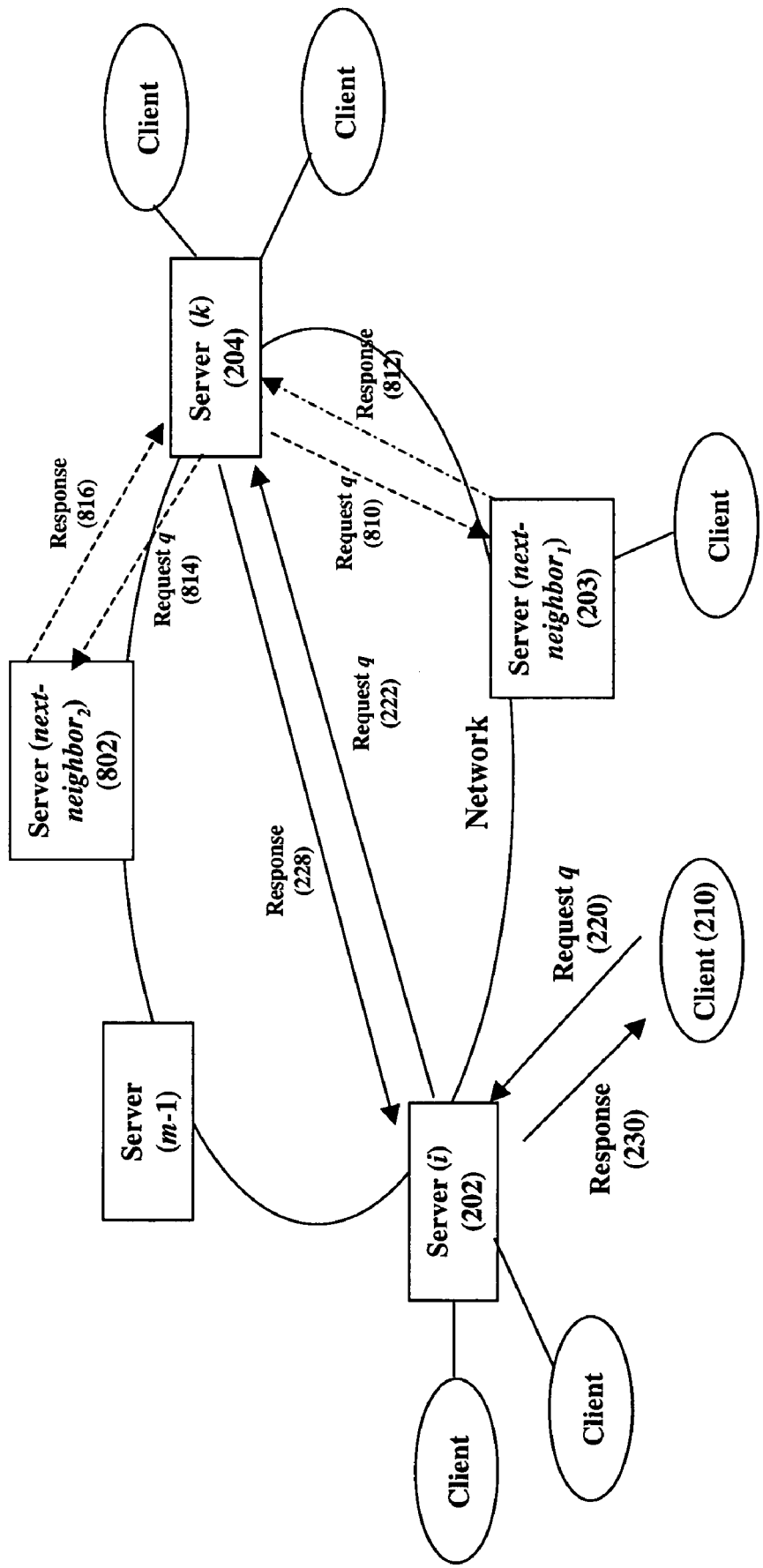
FIG. 8 depicts an illustrative example of our invention as depicted in FIGS. 7A, 7B, and 7C.

FIGS. 7A, 7B, and 7C show a fourth embodiment of our invention and FIG. 8 shows an illustrative example of this embodiment. In accordance with this embodiment, each server maintains two or more next-neighbor servers rather than one (for ease of description, FIGS. 7A, 7B, and 7C and FIG. 8 are with respect to two next-neighbor servers.) This embodiment proceeds similar to the first embodiment, with server i 202 executing the method steps of FIG. 7A, which are the same steps as FIG. 3A. Proceeding with FIG. 7B, server k 204 receives the request from server i in step 310. As above, if server k is not overloaded, it processes the request q itself (steps 312-320).

However, if server k 204 is overloaded, it proceeds to step 702 and makes a relative comparison of its work load to each of its next-neighbor servers (e.g., servers 203 and 802), determining whether either next-neighbor is more lightly loaded than itself and therefore in a better position to process request q. In accordance with this embodiment of our invention, server k may maintain separate constants, $\theta_{k1}$ and $\theta_{k2}$, for this comparison. Again, each $\theta$ should be set based on the relative computing power between the two servers that are under comparison. If neither next-neighbor server is more lightly loaded, server k 204 processes the request q itself, retuning the response to the client 210 (steps 314-316). However, if either next-neighbor server 203/802 is more lightly loaded, server k proceeds to step 706 and forwards the request q to the more under-utilized server for processing (as shown by 810/814) (again, rather than server k 204 forwarding the request to the next-neighbor server 203/802, server k can notify server i of the next-neighbor server and have server i forward the request). Server k then waits for a response from server 203/802 (as shown by 812/816), eventually returning the response to the client (steps 708, 710, 316, 318, and 320). (Note, as a further alternative, rather than server k comparing its load to both next-neighbors at the same time, it can compare its load first to one neighbor, forwarding the request to this neighbor for processing if the neighbor is less loaded. The server k will only examine the second neighbor if the first neighbor is heavier loaded than server k). Again, the next-neighbor server processing the request can proceed similar to the first embodiment, executing the method steps of FIG. 7C, which are the same steps as FIG. 3C, or can proceed similar to third embodiment, executing the method steps of FIG. 7B.

The above-described embodiments of our invention are intended to be illustrative only. Numerous other embodiments may be devised by those skilled in the art without departing from the spirit and scope of our invention.

We claim:

1. A method for processing requests such that request processing is load-distributed among a plurality of servers, the method comprising the steps of:
   receiving a request at one server of the plurality of servers;
   forwarding the request at random to a first server by the one server;
   if overloaded, comparing a current load of the first server to the current load of a second server wherein the second server is predetermined to the first server, the first server having to learn or track the load only of the predetermined second server and not any of the other servers; and
   if the load of the first server exceeds the load of the second server, forwarding the request to the second server for processing;
   prior to said comparing step, the step of comparing the current load of the first server to an overload constant to determine if the first server is overloaded; and
   prior to said receive step, the step of receiving a message from the second server wherein the current load of the second server is piggybacked on the message.

2. The method of claim 1 further comprising the step of processing the request if the load of the first server is less than or comparable to the load of the second server.

3. The method of claim 1 further comprising the step of processing the request if not overloaded.

4. The method of claim 1 wherein said first server forwards the request to the second server through the forwarding server from which the request was received.

5. The method of claim 1 wherein the plurality of servers are peers within a peer-to-peer network.

6. The method of claim 1 further comprising the steps of
   if the load of the second server exceeds the load of the first server, comparing the current load of the first server to the current load of a third of the servers wherein the third server is predetermined to the first server, and forwarding the request to the third server for processing if the load of the first server exceeds the load of the third server.

7. The method of claim 6 further comprising the step of processing the request if the load of the first server is less than or comparable to the loads of the second and third servers.

8. A method for processing requests such that request processing is load-distributed among a plurality of servers, the method comprising the steps of:
   receiving a request at one server of the plurality of servers;
   forwarding the request at random to a first-chance server by the one server;
   if not overloaded, processing the request, if overloaded, comparing the first-chance server's current load to a current load of at least two other servers wherein the at least two other servers are predetermined to the first-chance server, the first-chance server having to learn or track only the load of said two predetermined servers and not any of the other servers; and
   if the load of the first-chance server exceeds the load of any of the at least two other servers, forwarding the request to one of the at least two other servers for processing;
   wherein the first-chance server determines if it is overloaded by comparing its current load to an over-load constant;
   receiving messages from the at least two other servers wherein the current loads of the at least two other servers are piggybacked on the messages.

9. The method of claim 8 further comprising the step of processing the request if the first-chance sewer is overloaded and the load of the first-chance server is comparable to or less than the load of the at least two other servers.

10. A method for processing client requests such that the request processing is load distributed among a plurality of servers, said method comprising the steps of:
    receiving a client request at a first server;
    randomly selecting a second server from the plurality of servers and forwarding the client request from the first server to the second server;
    if the second server is overloaded, comparing the second server's current load to a current load of a first neighbor server wherein the first neighbor server is predetermined to the second server, the second server having to learn or track the load only of said predetermined first neighbor server and not any of the other servers; and if the load of the second server exceeds the load of the first neighbor server, forwarding the client request to the first neighbor server and the first neighbor server processing the client request;

wherein the second server determines if it is overloaded by comparing its current load to an over-load constant;

receiving a message from the first neighbor server wherein the current load of the first neighbor server is piggy-backed on the message.

11. The method of claim 10 wherein if second server is not overloaded, the second server processing the request.

12. The method of claim 10 wherein each of the plurality of servers has a unique predetermined neighbor server.

13. The method of claim 10 wherein said processing step by the first neighbor server further comprising the steps of:

if the first neighbor server is overloaded, comparing the first neighbor server's current load to a current load of a second neighbor server, and if the load of the first neighbor server exceeds the load of the second neighbor server, forwarding the client request to the second neighbor server and the second neighbor server processing the client request.

14. The method of claim 10 wherein if the second server is overloaded and the load of the first neighbor server exceeds the load of the first-chance server, the method further comprising the steps of:

comparing the second server's current load to a current load of a second neighbor server wherein the second neighbor server is predetermined to the second server, and forwarding the client request to the second neighbor server if the load of the second server exceeds the load of the second neighbor server and the second neighbor server processing the client request.

\* \* \* \* \*

UNITED STATES PATENT AND TRADEMARK OFFICE
CERTIFICATE OF CORRECTION

PATENT NO.        : 7,620,687 B2                                                  Page 1 of 1
APPLICATION NO.   : 10/876983
DATED             : November 17, 2009
INVENTOR(S)       : Chen et al.

It is certified that error appears in the above-identified patent and that said Letters Patent is hereby corrected as shown below:

In the Specification

In Column 1, Line 28, delete "peer/servent" and insert -- peer/servant --, therefor.

In the Claims

In Column 12, Line 22, in Claim 6, delete "steps of" and insert -- steps of: --, therefor.

Signed and Sealed this
Twentieth Day of January, 2015

Michelle K. Lee
*Deputy Director of the United States Patent and Trademark Office*